H. GODBERSEN.
CORN-PICKING AND HUSKING MACHINE.
APPLICATION FILED JULY 11, 1916.

1,275,551.

Patented Aug. 13, 1918.
5 SHEETS—SHEET 1.

Inventor
Henry Godbersen
By his Attys

H. GODBERSEN.
CORN PICKING AND HUSKING MACHINE.
APPLICATION FILED JULY 11, 1916.

1,275,551.

Patented Aug. 13, 1918.
5 SHEETS—SHEET 2.

Inventor
Henry Godbersen
By his Attys
Baldwin Wight

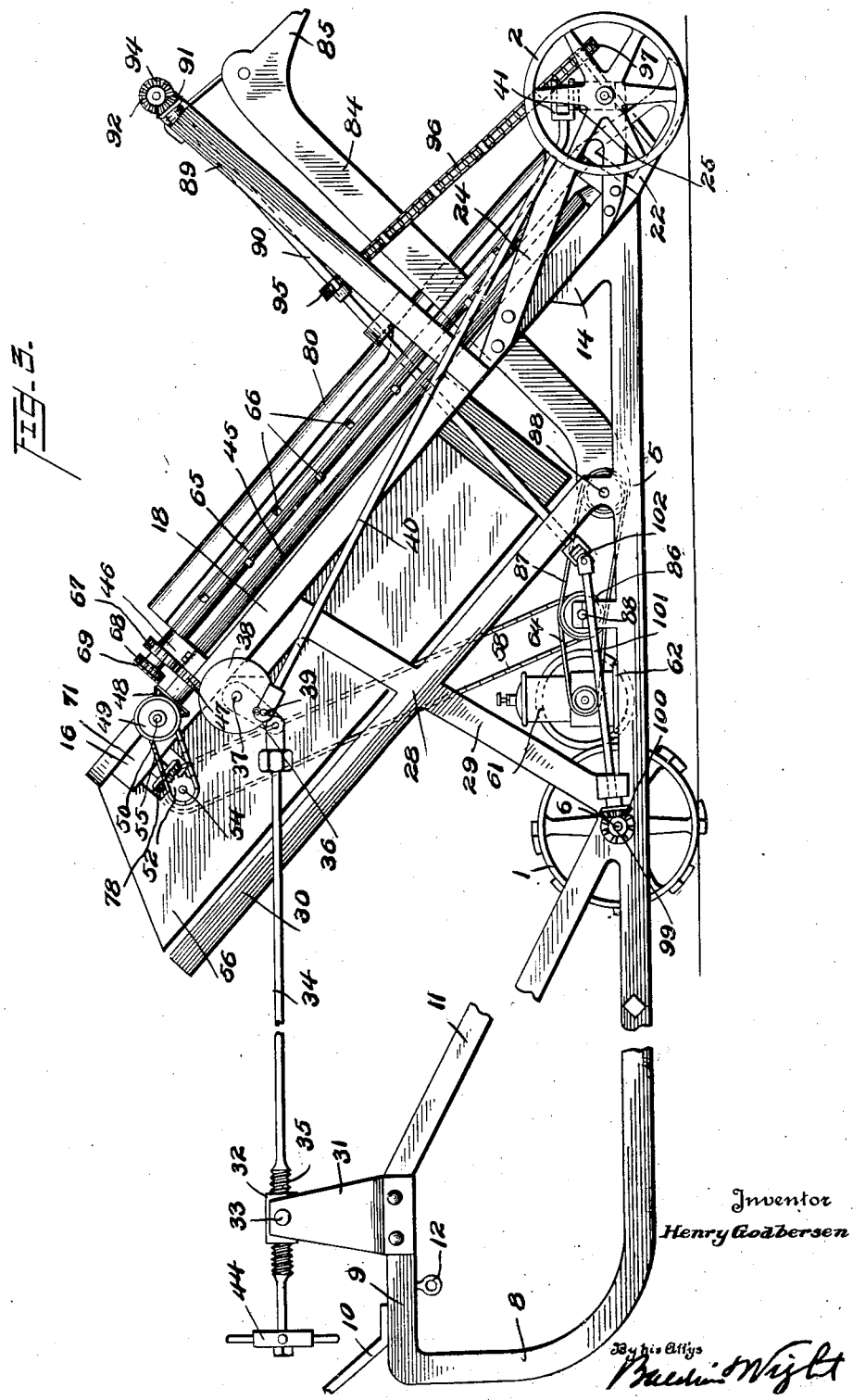

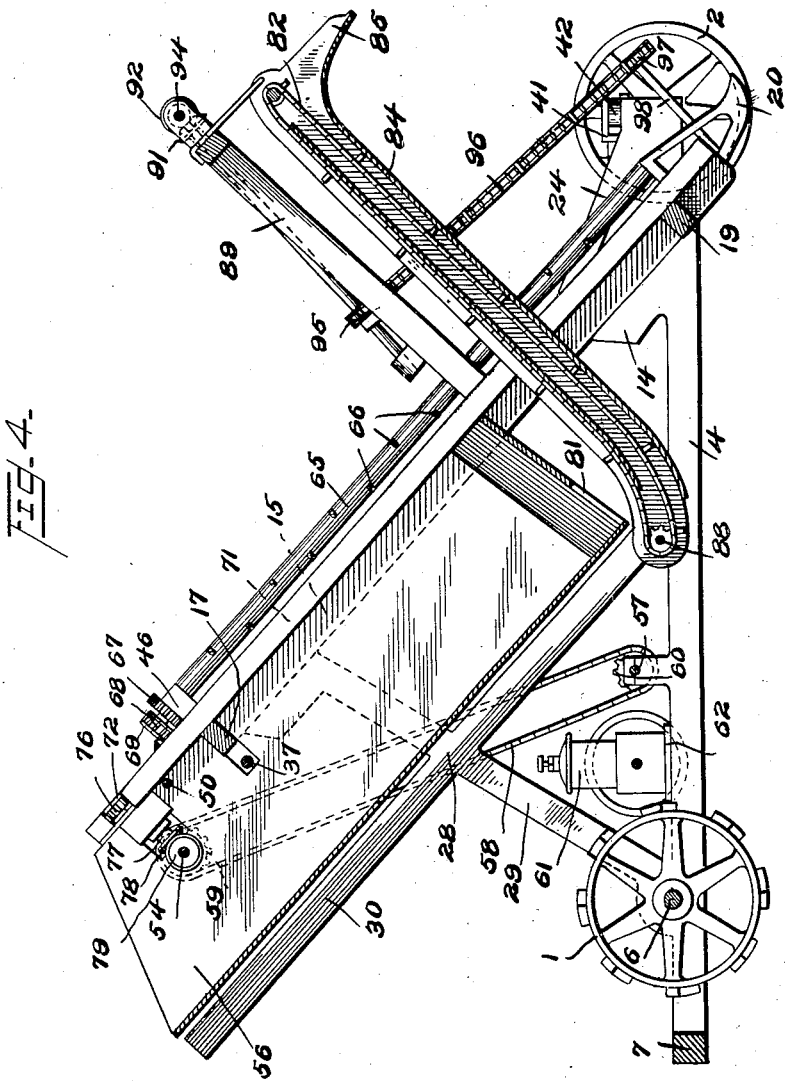

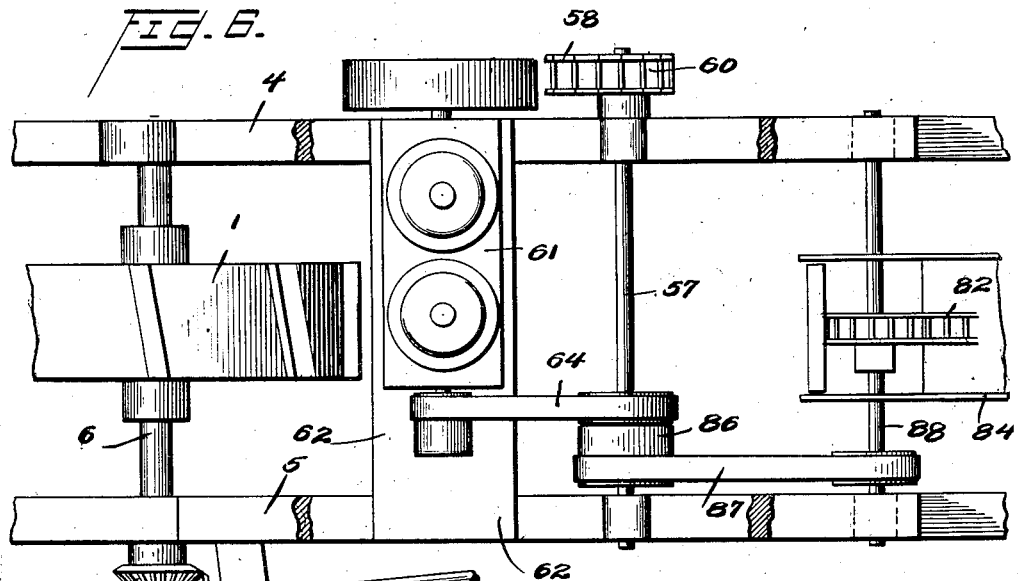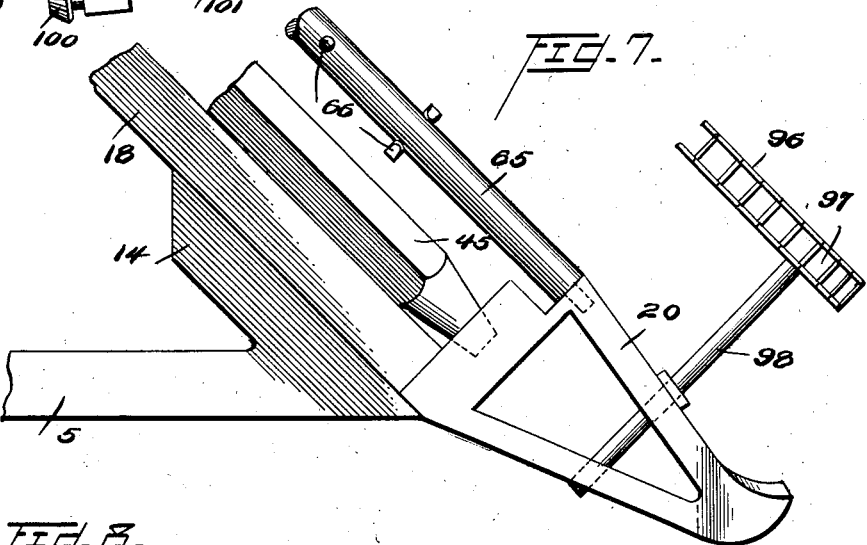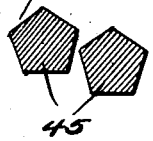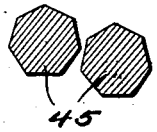

UNITED STATES PATENT OFFICE.

HENRY GODBERSEN, OF CHARTER OAK, IOWA, ASSIGNOR TO CORN HUSKERS INVESTMENT CO., OF UTE, IOWA, A CORPORATION OF IOWA.

CORN PICKING AND HUSKING MACHINE.

1,275,551.

Specification of Letters Patent.

Patented Aug. 13, 1918.

Application filed July 11, 1916. Serial No. 108,634.

*To all whom it may concern:*

Be it known that I, HENRY GODBERSEN, a subject of the Emperor of Germany, and a resident of Charter Oak, in the county of Crawford and State of Iowa, have invented certain new and useful Improvements in Corn Picking and Husking Machines, of which the following is a specification.

This invention relates broadly to machines adapted to be driven over a field of standing corn, for gathering the ears therefrom and husking the same.

The principal object of this invention is to provide gripping rollers having a peculiar configuration to insure the pinching off of all of the ears of corn.

A further object of the invention resides in the provision of husking rollers mounted in such manner as to coöperate with the gripping rollers to remove all of the ears from the husks and leave the husks attached to the standing stalks.

Another object of the invention is to provide means for picking up the bent and fallen stalks and guiding them between the gripping rollers.

A still further object of the invention is to provide a carrying trough with means for delivering the husked ears thereto, and provided with means for removing the husked ears therefrom as desired, together with means for independently operating either of the before mentioned means at will.

Other objects of the present invention will in part be obvious and will in part be pointed out in the following specification and drawings forming a part thereof, throughout which like characters of reference are used to indicate like parts.

In the drawings Figure 1 is a plan view.

Fig. 3 is a side view.

Fig. 4 is a longitudinal section on line 4—4 of Fig. 1 looking in the direction of the arrows.

Fig. 6 is a plan view of the driving engine shown in Fig. 4.

Fig. 7 is an enlarged detail view of the lower bearing and guard for the gripping and husking rollers.

Figs. 8 and 9 are enlarged cross sectional views of different forms of gripping rollers.

Figure 1:
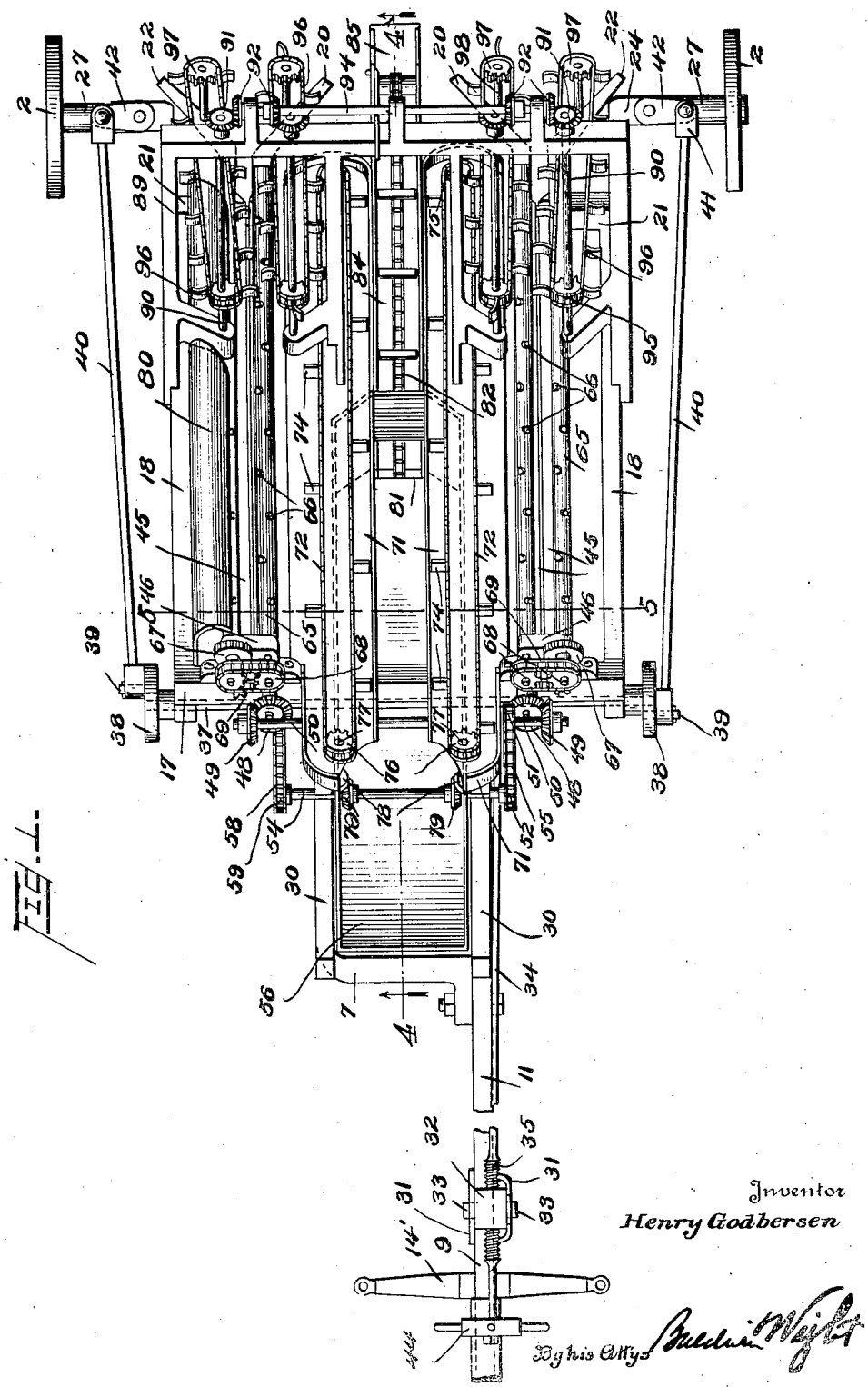
Figure 2:
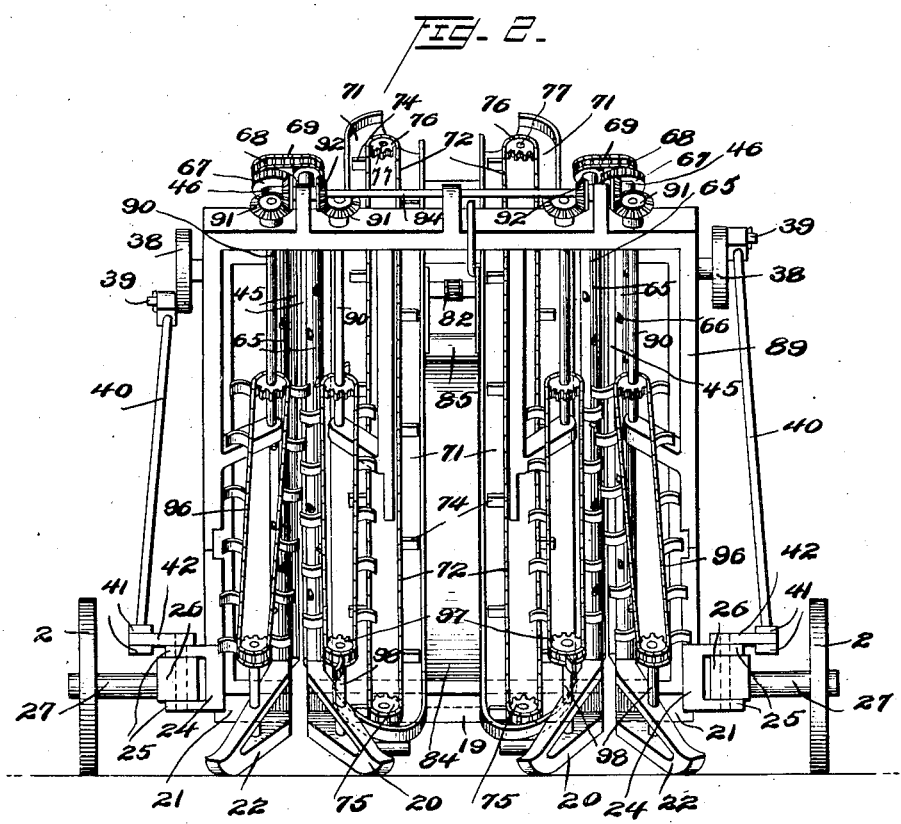
Fig. 2 is a front view.

In machines of this general class it has heretofore been customary to provide a pair of suitably constructed rollers for snapping or pinching the ears of corn from the stalks, and subsequently delivering the picked ears to a husking or cleaning mechanism. In my invention the husking rollers coöperate directly with the gripping roller so that while the lower or stem portion of the ear is being gripped, the husking mechanism will be operating on the upper portion of the ear to detach the husks and silk therefrom, while the ear is still attached to the stalks.

Referring more particularly to the drawings there is provided a master carrying wheel 1 and a pair of auxiliary supporting wheels 2 which carry the main framework and associated parts of the machine. This framework preferably comprises a pair of parallel longitudinally extending beams 4 and 5, between and adjacent the rear end of which the carrying wheel is mounted on an axle 6 journaled therein. The beam 4 terminates slightly to the rear of the carrying wheel and is secured to the beam 5 by the brace 7, which also forms a guard for the wheel. The beam extends beyond the brace 7, and is provided with an upwardly curved portion 8 supporting a frame 9 which may carry a platform 10 for the operator. The forward end of the frame may be braced by a strut 11 secured to the beam 5. The frame 9 is provided on the lower side thereof with a hook or ring 12 to which eveners or double trees 14' may be mounted as desired when the machine is used with draft animals.

The forward ends of the beams are provided with supplemental or upturned portions 14 which are adapted to support an inclined or angularly disposed auxiliary frame. This frame preferably comprises a pair of central beams 15 and 16 secured adjacent their upper ends by the cross-beam 17, which has secured to the outer end thereof a pair of side beams 18 extending in the same plane as the central beams. The lower ends of the central beams are connected by a cross arm 19, the ends of which project slightly beyond the sides of the central beams and carry triangularly shaped nose pieces or guards 20, while the side beams are provided with angular extensions 21 having their ends terminating adjacent to but spaced from the ends of the cross arm a sufficient distance to permit the passage therebetween of a row of corn stalks. Mounted on the ends of the angular extensions are nose pieces or guards 22 which are adapted to coöperate with the guards 20 for a purpose hereinafter more fully explained. Mounted on the side beams 18 are wheel supporting members 24 having bifurcated ends 25. Pivotally mounted between the opposite members of the bifurcated portions are blocks 26 having stub axles 27 upon which are carried the auxiliary supporting wheels hereinbefore referred to. The rear and upper end of the auxiliary frame is supported by the X-shaped side frames 28 composed of intersecting members 29 and 30, the members 29 being secured at their upper ends to the central beams of the auxiliary frame, while the members 30 are spaced from and extend parallel thereto.

The steering mechanism for the improved machine comprises a pair of bearing plates 31 secured to the forward portion of the frame 9 adjacent the operator's platform and having mounted therebetween an internally threaded bearing 32 provided on the opposite sides with trunnions 33 to permit pivotal movement of the bearing. Extending through the bearing 32 is a rod 34 having a threaded portion 35 coöperating with the bearing member. The forward end of the rod may be secured in any desired manner to the crank arm 36 carried by the cross shaft 37 suitably journaled in the auxiliary frame. On the opposite ends of the cross shaft are crank wheels 38 having eccentrically mounted pins 39 for connection to the pitman rods 40 which may have lower bifurcated ends 41 adapted to straddle the crank arms 42 connected as desired to the blocks carrying the stub axles. On the opposite end of the rod 34 there may be provided any form of operating means such as a hand wheel 44 conveniently disposed with relation to the operator's platform. It will now be apparent that upon turning the hand wheel, the rod 34 will be longitudinally advanced or retracted by reason of its threaded engagement, and will thereby rotate the cross shaft 37 either in clockwise or counterclockwise direction to move the crank wheels operatively mounted thereon, and thereby transmit movement through the pitman 40 and associated parts to the stub axles.

The picking mechanism is carried by the auxiliary frame and comprises a pair of gripping or pinching rollers 45 for each row of stalks being acted upon. The upper ends of the gripping rollers extend through and are journaled in bearing blocks 46 carried by the cross beam 17 of the auxiliary frame, while the lower ends of the rollers are journaled in the nose pieces 20 and 22 as shown more particularly in Fig. 7. The gripping rollers are preferably polygonal in cross-section and are mounted in a forwardly and laterally inclined plane with the outer roll of each pair in a plane located parallel to but slightly above the plane of the inner roller, so that the edges of one roller coöperate with the central portion of the face of an adjoining roller as clearly shown in Figs. 8 and 9. By reason of this particular relation the edges of the rollers act to grip and cut the stems, the faces thereof serving as platens to permit such an action. The rollers also present gradually converging walls to the stems so that after the stem is engaged thereby, continued rotation will securely wedge the stems tighter and tighter until the ear is snapped or pinched from the stalk. The rollers are spaced apart a sufficient distance to permit the passage therebetween of the corn stalks to be operated upon, these corn stalks being guided by the divergent nose pieces or guards, through the openings in the frame before referred to, and then to the gripping rollers. In order to prevent the stalks from being pulled from the ground, it is necessary that these rollers should be rotated with their adjacent faces moving downwardly at a speed dependent upon the speed of travel of the entire machine. For rotating each pair of rollers there may be provided intermeshing spur gears 47 on the upper ends thereof so that rotation in opposite directions in synchronism is insured. For driving the spur gears there may be used bevel gears 48 mounted upon the upper ends of the inner roller of each pair, and meshing with bevel gears 49 on opposite ends of the cross shaft 50 which may be journaled in any desired manner in the projecting ends of the central beams 15 and 16 of the auxiliary frame. Adjacent one end thereof the cross shaft carries a sprocket wheel 51 adapted to be driven from the sprocket wheel 52 on the shaft 54 by means of the sprocket chain 55. The shaft 54 extends transversely through the sides of the chute or carrier 56 and is adapted to be driven from the jack shaft 57 by means of a chain or belt 58 operating over suitable pulleys or sprockets 59 and 60 on the respective shafts.

For furnishing power to drive the picking mechanism heretofore described, there may be used an engine 61 of any desired construction mounted on the platform 62 carried by the longitudinally extending beams of the main frame, and driving the jack shaft through the medium of the belt or sprocket 64. From the foregoing it will be obvious that when the machine is being driven across a field of corn, the engine is utilized to drive the gripping rollers by means of the described gearing at a sufficiently high speed to prevent any pulling action being exerted on the stalks. The rollers being spaced apart only a sufficient distance to permit the passage of the stalks therebetween, it will be apparent that the ears will be caught or gripped by the rollers, and that continued rotation thereof will tend to pinch or snap the same from the stalks.

During the time that the ears are being acted upon by the gripping rollers they are also in position to be engaged by the husking mechanism forming a part of this invention and comprising pairs of husking or opening rollers 65 corresponding in number to the gripping rollers, and mounted above and having their axes parallel to the axes of the gripping rollers, the husking or opening rollers 65 being all located in substantially the same forwardly inclined plane. These husking or opening rollers are provided throughout their length at desired intervals with knives or cutters 66 which are adapted to engage with and cut or tear the husks from the ear. For causing this cutting action, each pair of shafts may be rotated by a spur gear 67 meshing with one of the spur gears which drive the gripping rollers. It is desirable to have each pair of the husking or opening rollers 65 rotating in the same direction and for this purpose there may be provided sprockets 68 on the outer ends of the shafts adapted to be driven by the sprocket chains 69. By reason of the fact that the shafts carrying the cutters are operatively driven by the gripping rollers, it is obvious that they will rotate in unison therewith, and that such rotation will cause the knives to tear or cut the husks from the ear. I have found that advantageous results are produced by rotating the shafts so that the inner faces of the inside shafts of each pair rotate downwardly.

Figure 5:
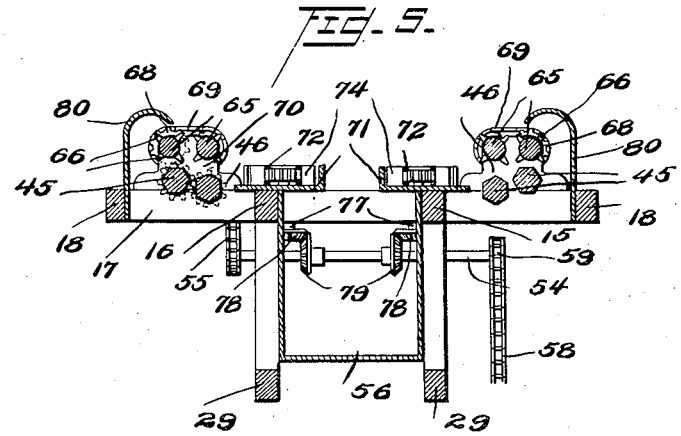
Fig. 5 is a cross sectional view on the line 5—5 of Fig. 1.

The corn after having been husked in the manner described, is forced through the openings 70 between the inner gripping roller and its adjacent shaft. Movement of the ears in this manner is insured by having the outer gripping roller of each pair at a higher elevation than the inner roller, and by the rotation of the shafts as above set forth. As the ears emerge through these openings from the gripping and husking mechanisms, they are received in the troughs 71 carried by the auxiliary frame and in which are mounted endless flights 72 having buckets 74 carried thereby. The flights pass over guiding sprockets 75 at their lower ends and are preferably driven at their upper ends by the sprockets 76 mounted on stub shafts 77 journaled in the central beams of the auxiliary frame, and carrying beveled gears 78 at their lower ends meshing with the driving bevels 79 on the cross shaft 54, so that the flights are operated in unison with the gripping and husking mechanism, to uniformly remove the ears therefrom as they are husked. In order to prevent the husked ears from passing over the outside of the machine there may be provided guards 80 carried in any desired manner by the auxiliary frame. Such a construction is clearly shown in Fig. 5, and in Fig. 1, one of the guards being removed in the latter figure for the sake of clearness.

The elevating flights deliver the husked ears at their upper ends to the chute or carrier 56. The chute may be provided with an opening 81 at its lower end adapted to be closed in any well known manner, and which may be opened as desired to permit the passage of the ears to the elevator 82 operating over the pivotally mounted guide 84. By pivotally mounting the guide and elevating mechanism it is possible to regulate the height of the discharge 85 to accommodate the same to the height of the vehicle or receptacle being loaded. The elevating mechanism is usually operated when the machine is at rest and this may be accomplished by shifting the engine belt 64 from the position shown in Fig. 6 onto the loose pulley 86 of the jack shaft, power being transmitted from the loose pulley to drive the elevator by the belt 87 and shaft 88 forming the pivotal mounting for the guide and elevator. By reason of this construction this mechanism may be operated at any desired time independently of the remaining mechanism to effect discharge of the husked corn.

I have found that corn is often so badly bent that it is desirable to provide a supplemental feeding mechanism to insure the proper passage of the stalks to the gripping rollers. This mechanism may comprise a frame 89 mounted on the auxiliary frame and projecting upwardly therefrom at substantially right angles. The frame preferably carries a plurality of vertically disposed shafts 90 arranged in pairs and provided with bevel gears 91 at their upper ends meshing with the bevel gears 92 carried by the shaft 94 extending transversely of the frame. This gearing is such that each adjacent pair of vertical shafts rotates with their adjoining faces moving in opposite directions. Intermediate the length of the shafts may be mounted sprockets 95 around which pass guiding or feeding belts 96 guided at their lower ends by sprockets 97 carried on the shafts 98, journaled in the nose pieces. In order to rotate the guiding belts at a speed directly dependent upon the speed of travel of the machine, so as not to bend or break the stalks, there may be utilized a bevel gear 99 on the shaft 6 of the main carrying wheel meshing with a bevel gear 100 splined to the shaft 101 in any well known manner. This shaft is in turn preferably connected to the lower end of one of the vertical shafts 90 by means of the universal joint 102, so that rotation of the carrying wheel imparts rotation to the feeding and guiding belts.

This frame also coöperates with the cross beam 17 of the auxiliary frame and gives added rigidity to the entire machine, and effectually prevents separation of the nose pieces and displacement thereof from their adjusted positions.

From the foregoing description, taken in connection with the drawings, it will be obvious that I have provided a machine which insures the passage of corn stalks to the picking mechanism. By reason of the peculiar shape of the gripping rollers, which may have a different number of sides within definite limits, as shown in Figs. 8 and 9, the ear is firmly gripped and held in such position that the husking mechanism may effectively remove the husks therefrom. This coöperation between the husking and the gripping rollers produces very advantageous results, which are not produced where separate and independent picking and husking mechanisms are employed. As before stated, the husks are slit or cut from the ear but left attached to the stalks so that the ear is removed from the stalk in husked condition. By reason of this operation, the husks never get caught in the machine so as to clog the parts and prevent the operation thereof. This is not true of machines which remove the ear, husks and all from the stalks, and then subsequently cut away the husks. If the number of faces on each roller is increased or decreased beyond a predetermined limit, no effective wedging action will occur. Experiment has shown that from five to seven faces produces the best results.

While I have described and illustrated the preferred embodiment of my invention it will be obvious that changes may be made therein within the scope of the appended claims without departing from the spirit thereof, and although the machine shown is intended to operate upon two rows of corn, it is apparent that this may be varied if desired.

Having thus described my invention, what I claim is:—

1. In a corn picking and husking machine, the combination with a plurality of coöperating polygonal picking rollers located in a forwardly and laterally inclined plane, each roller having flat faces intersecting at an angle of more than ninety degrees to form cutting edges and having their adjacent faces moving in the same direction, of a plurality of overlying husking rollers lying in a forwardly inclined plane, and having their adjacent faces moving in opposite directions.

2. In a corn picking and husking machine, the combination with a plurality of coöperating picking rollers located in a forwardly and laterally inclined plane, each roller having more than four and less than eight faces meeting to form cutting edges, the edges of one roller coöperating with the faces of the adjacent roller whereby said faces act as platens for the cutting action of the edges, of means for moving the adjacent faces of said rollers in the same direction, a plurality of overlying husking rollers lying in a forwardly inclined plane, and having their adjacent faces moving in opposite directions.

3. In a corn picking and husking machine, the combination with a plurality of coöperating polygonal picking rollers located in a forwardly and laterally inclined plane and having their adjacent faces moving in the same direction, of a plurality of overlying husking rollers lying in a forwardly inclined plane, and having their adjacent faces moving in opposite directions.

4. In a corn picking and husking machine, the combination with a plurality of oppositely rotating polygonal rollers having their axes located in a forwardly and laterally inclined plane, of a plurality of overlying husking rollers coöperating therewith, said husking rollers rotating in the same direction and having their axes lying in a forwardly inclined plane.

5. In a corn picking and husking machine, the combination with a pair of picking rollers lying in a forwardly and laterally inclined plane and having their adjacent faces moving in the same direction, of a pair of husking rollers disposed in a forwardly inclined plane overlying said picking rollers and coöperating therewith for husking an ear while supported thereby, said husking rollers having their adjacent faces moving in opposite directions.

6. In a corn picking and husking machine, the combination with a pair of oppositely rotating polygonal picking rollers located in a forwardly and laterally inclined plane and having the edges of one roller coöperating with the faces of the other roller so that the supporting stalk is gradually wedged therebetween, of a pair of overlying rollers lying in a forwardly inclined plane and moving in the same direction to slit the husks on the opposite sides of an ear while held by the picking rollers before the same is snapped from the stalk.

7. In a corn picking and husking machine, a pair of picking rollers, a pair of overlying husking rollers, said picking rollers having their axes located in a forwardly and laterally inclined plane so that one of the rollers is higher than the other to provide a space between said roller and one of the husking rollers, and means for rotating said rollers to cause the passage of husked ears through said space.

In testimony whereof, I have hereunto subscribed my name.

HENRY GODBERSEN.

Witnesses:
A. H. SCHELM,
F. W. SCHELM.